United States Patent
Cappello et al.

(10) Patent No.: US 10,922,879 B2
(45) Date of Patent: Feb. 16, 2021

(54) METHOD AND SYSTEM FOR GENERATING AN IMAGE

(71) Applicant: Sony Interactive Entertainment Inc., Tokyo (JP)

(72) Inventors: Fabio Cappello, London (GB); Matthew William Sanders, Middlesex (GB); David Erwan Damien Uberti, London (GB); Andrew William Walker, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/517,853

(22) Filed: Jul. 22, 2019

(65) Prior Publication Data

US 2020/0035019 A1 Jan. 30, 2020

(30) Foreign Application Priority Data

Jul. 25, 2018 (GB) .................................. 1812141.8

(51) Int. Cl.
*G06T 17/00* (2006.01)
*G06T 7/00* (2017.01)
(Continued)

(52) U.S. Cl.
CPC ............ *G06T 17/00* (2013.01); *A63F 13/497* (2014.09); *A63F 13/52* (2014.09); *G06T 7/70* (2017.01);
(Continued)

(58) Field of Classification Search
None
See application file for complete search history.

(56) References Cited

U.S. PATENT DOCUMENTS

| 2012/0176366 A1* | 7/2012 | Genova | G06T 15/205 345/419 |
| 2012/0229609 A1* | 9/2012 | Yamada | G06T 7/579 348/46 |

(Continued)

FOREIGN PATENT DOCUMENTS

| EP | 1862969 A1 | 12/2007 |
| GB | 2452512 A | 3/2009 |

OTHER PUBLICATIONS

Search and Examination report for corresponding GB Application No. 1812141.8, 4 pages, dated Jan. 25, 2019.

*Primary Examiner* — Frank S Chen
(74) *Attorney, Agent, or Firm* — Matthew B. Dernier, Esq.

(57) ABSTRACT

A method of generating an image includes receiving a video stream, the video stream having a two-dimensional video of a three-dimensional scene captured by a video camera; determining a mapping between locations in the two-dimensional video of the scene and locations in a three-dimensional representation of the scene, the mapping being determined based on a known parameter of the video camera and a known size of a feature in the three-dimensional scene; generating a three-dimensional graphical representation of the scene based on the determined mapping; determining a virtual camera angle from which the three-dimensional graphical representation of the scene is to be viewed; rendering an image corresponding to the graphical representation of the scene viewed from the determined virtual camera angle, and outputting the rendered image for display.

17 Claims, 7 Drawing Sheets

(51) Int. Cl.
*H04N 13/111* (2018.01)
*A63F 13/497* (2014.01)
*A63F 13/52* (2014.01)
*G06T 7/70* (2017.01)

(52) U.S. Cl.
CPC ...... *H04N 13/111* (2018.05); *A63F 2300/634* (2013.01); *A63F 2300/66* (2013.01); *G06T 2207/10016* (2013.01)

(56) References Cited

U.S. PATENT DOCUMENTS

2012/0314030 A1    12/2012  Datta
2018/0075593 A1*  3/2018  Wang ................ G06K 9/00281

\* cited by examiner

METHOD AND SYSTEM FOR GENERATING AN IMAGE

BACKGROUND OF THE INVENTION

Technical Field

The present disclosure relates to a method of generating an image and a system.

Description of the Prior Art

Real-time events such as live sporting events are often viewed by millions of people across the globe. Typically, these events are captured by multiple different video cameras located at different locations around a stadium, with each camera providing a different perspective of the on-going action. In the example of a football (soccer) game, one camera may be located above the pitch and have a moveable position—a so-called 'spidercam', whilst another may be located behind the goal. Each of these camera positions may be suited to capturing a respective type of action occurring within the game. For example, the video camera above the pitch may be useful for providing an overall view of the players and their respective positions, whilst the camera behind the goal may be useful for providing a view of any goals scored during the game.

The use of multiple video cameras enables a viewer to view an in-game event, such as e.g. a goal, tackle, offside, etc. from multiple different camera angles. Usually, at least one of the camera angles will provide a user with a sufficient view of the event. However, the degree of control that a user is able to exert over the camera angle from which an in-game event is viewed is often limited. Typically, the user has no control over how the in-game event is conveyed to them and has to rely on a broadcaster to select an appropriate camera. Even when the user does have some control over the view of an in-game event, this is typically limited to the views provided by a select few video cameras located at different locations around the pitch. It is not possible, for example, for a viewer to move the camera, so as to view an in-game event from a camera angle of their choosing.

The present invention seeks to address this problem.

SUMMARY OF THE INVENTION

According to a first aspect disclosed herein, there is provided a method of generating an image in accordance with claim 1.

In another aspect, there is provided a method of generating an image in accordance with claim 12.

In another aspect, there is provided a system in accordance with claim 14.

In yet another aspect, there is provided a system in accordance with claim 18.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

Figure 1:
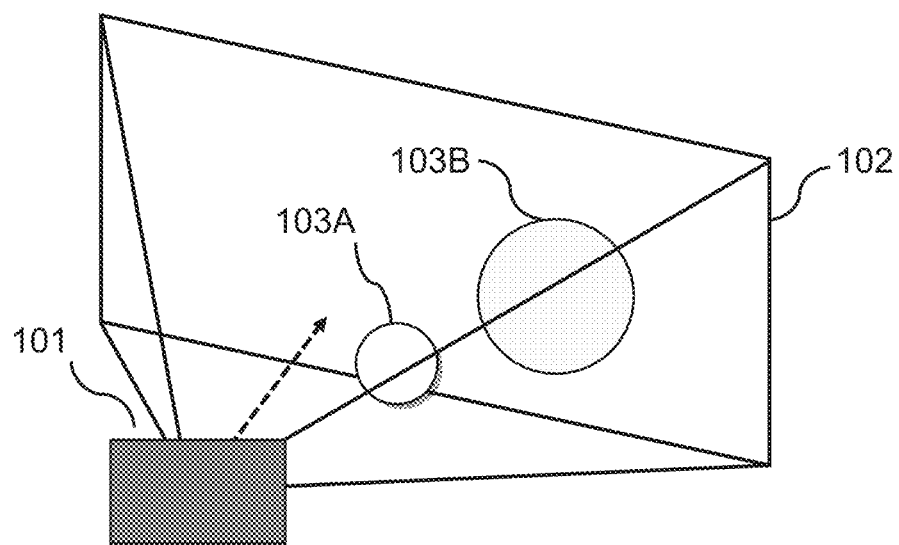
FIG. 1 shows schematically an example of a camera and two objects within the field of view of the camera.
Figure 2:
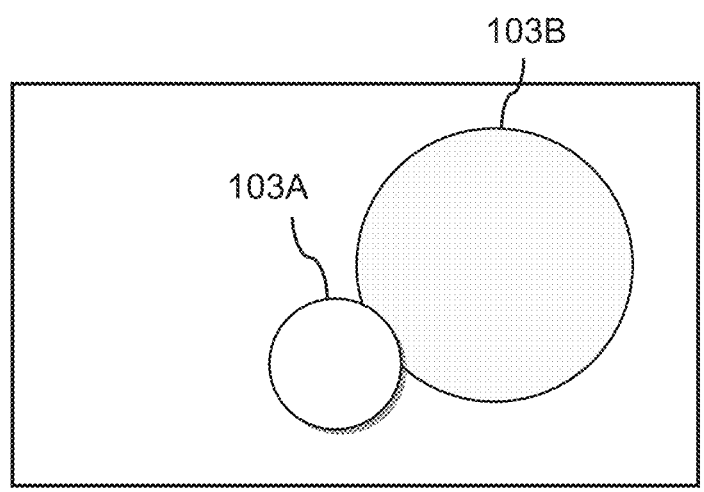
FIG. 2 shows schematically an example of an image captured by a camera.

Referring now to the drawings, wherein like reference numerals designate identical or corresponding parts throughout the several views, FIG. 1 shows schematically an example of a camera 101. The camera captures light from a real-world scene as a two-dimensional image. In the example shown, the real-world scene includes two objects 103A, 103B. An example of the two-dimensional image is shown in FIG. 2. The two-dimensional image is formed by measuring light that originates from the real-world and impinges upon the pixels of the camera's sensor. The camera may include one or more light guides, in the form of e.g. lenses, mirrors, pinholes, etc. that guide the incoming light onto the sensor.

It is known in the art that the light captured by the camera and how that light is associated with each pixel in the resulting image can be modelled using a projection matrix or a camera matrix. For example, the projection or camera matrix may be used as part of a pin-hole model in which the camera is modelled as a simple pinhole camera without a lens and with a single aperture.

In the pin-hole model, the pinhole camera parameters are represented in a 4-by-3 matrix called the camera matrix which maps the 3D world scene into the image plane. The camera matrix can be determined using the extrinsic and intrinsic parameters of the camera. The intrinsic parameters typically include the optical centre (also known as the principal point) and focal length of the camera. In some examples, the intrinsic parameters also include a skew coefficient that is defined as the number of pixels per unit length in each direction on camera's sensor. The skew coefficient may represent the amount by which one or more pixels deviate from being perfectly square or rectangular. The extrinsic parameters typically include a rotation (i.e. roll, pitch and yaw) and a translation of the camera, relative to the real-world scene.

Mathematically, the pinhole model may be represented by equation 1:

$$sm' = A[R|t]M'$$

Figure 3:
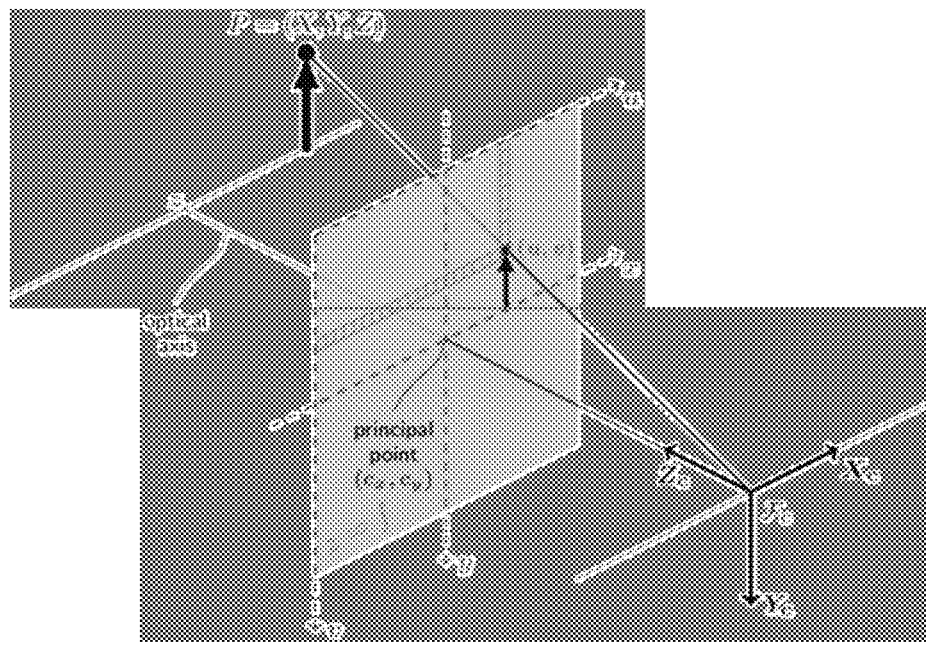
FIG. 3 shows schematically an example of a pinhole camera model.

Or, equivalently:

Camera matrix $$s\begin{bmatrix} u \\ v \\ 1 \end{bmatrix} = \begin{bmatrix} f_x & 0 & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix}$$

Where (X, Y, Z) are the coordinates of a 3D point in the world coordinate space, (u, v) are the coordinates of the projection point in pixels, A is a camera matrix or a matrix of intrinsic parameters, ($c_x$, $c_y$) is a principal point that is usually at the image centre and $f_x$, $f_y$ are the focal lengths expressed in pixel units. Here, the projection point refers to the point (i.e. location) on the camera's sensor that a point in the real-world is projected to. FIG. 3 shows schematically an example of a point P in the real world, and how that point is projected onto the camera's sensor at pixel position (u,v).

The matrix of intrinsic parameters does not depend on the scene viewed and can therefore be re-used as long as the focal length is fixed. The joint rotation-translation matrix [R|t] is called a matrix of extrinsic parameters. This matrix is used to describe the camera motion around a static scene or rigid motion of an object in front of a still camera. That is, [R|t] translates coordinates of a point (X, Y, Z) to a coordinate system fixed with respect to the camera.

It will be appreciated that the pin-hole model is a simplified model, and that in reality, the camera will include one or more lenses for focussing the incoming light onto the camera's sensor. For these cameras, the model may be extended so as to take into any account lens distortion introduced by the one or more lenses. This distortion typically includes radial distortion and slight tangential distortion. Thus the model may include radial and/or tangential distortion coefficients to describe the pixels in the image resulting from the distortion. Models for describing radial and tangential distortion introduced by lenses are well known in the art and need not be described herein, in order for the present invention to be understood.

Equation 1 describes the mapping between points in 3D space to the 2D image plane. However, embodiments of the present invention are concerned with the inverse mapping, that is, the mapping of points in the 2D image plane to points in the 3D real-world.

Figure 4:
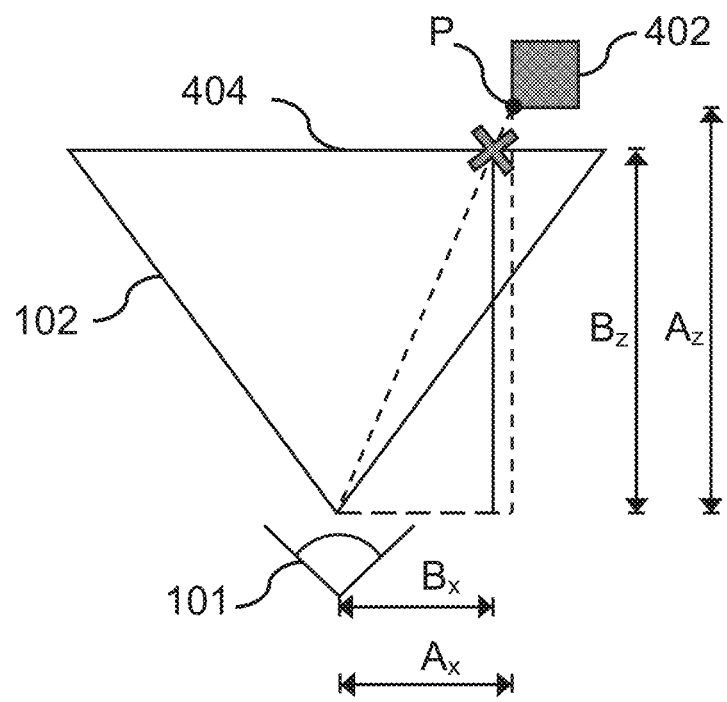
FIG. 4 shows a diagram for determining a location in a 3D space form a location in a 2D image.

FIG. 4 illustrates a top-down view of the camera 101, having a field of view 102, within which object 402 is contained. A light ray is shown as originating from point P on the surface of the object 402 and being received at the lens of the camera. The point on the camera's sensor (i.e. pixel) that is impinged by the light ray is shown at a location 'X'. The sensor itself is shown as a plane 404. It will be appreciated that, whilst the camera's sensor is shown in FIG. 4 (and in FIG. 3) as being located in front of the camera's lens, in reality, the sensor will be located behind the camera's lens. The sensor is shown as being in front of the lens as a matter of convention, the location corresponding to the positive of the camera's focal length.

The mapping between points in the two-dimensional image and the three-dimensional scene may be determined using the following equation:

$$A_x = \frac{B_x A_z}{B_z} \quad \text{(equation 2)}$$

Where $B_x$ represents the x coordinate on the camera's sensor; $A_x$ represents the corresponding x-coordinate in the three-dimensional scene; $B_z$ represents the focal length, i.e. the axial distance from the camera centre to the image plane; and $A_z$ is the distance of the subject (in this case, object 402) from the camera, otherwise known as depth. Each of these variables is shown in FIG. 4. The same equation may be used for determining the y-coordinate of the real-world object, but replacing $A_x$ and $B_x$ with $A_y$ and $B_y$ respectively.

From equation 2, it can be seen that if, for a given pixel, the focal length of the camera $B_z$ is known, and the distance of the subject $A_z$ is known, then the corresponding location of the subject in the real-world relative to the camera can be determined. Hence, by knowing these parameters, it is possible to reconstruct a three-dimensional version of the scene captured in the two-dimensional image. It will be appreciated that equation 2 represents the relationships for an ideal camera, and that in reality, further factors may need to be considered similar to those discussed previously herein.

Figure 5:
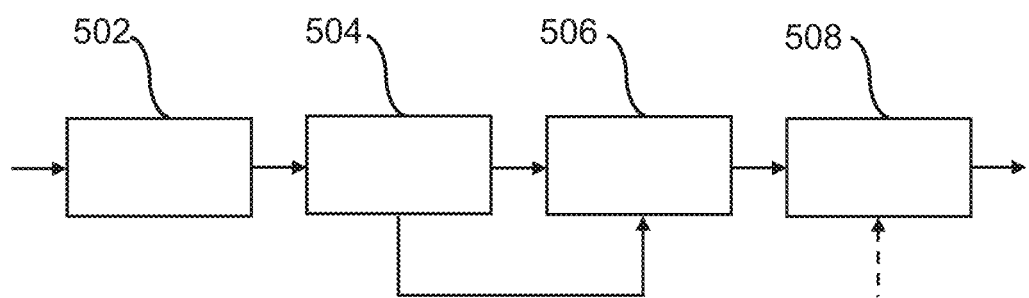
FIG. 5 shows schematically an example of a system in accordance with the present invention.

FIG. 5 shows schematically an example of a system in accordance with embodiments of the present disclosure.

The system comprises a receiving unit 502 for receiving a video stream. The video stream comprises a two-dimensional video of a three-dimensional scene captured by a video camera. In preferred embodiments, the video is of a real-time event, such as a live sporting event. The sporting event may be, for example, a football match, and the three-dimensional scene may correspond to part of the pitch captured by the video camera. The receiving unit 502 may be in communication with the video camera via a communications network, such as e.g. the internet.

The received video stream is provided as an input to a mapping processor 504. The mapping processor 504 is configured to determine a mapping between locations in the two-dimensional video of the scene and corresponding locations in the three-dimensional, real-world. The locations in the three-dimensional real-world are relative to the position of the camera, and therefore corresponding to coordinates in a 3D coordinate system, the origin of which corresponds to the location of the video camera. The mapping can then be used to create a 3D reconstruction of the scene, as will be described further, later.

The mapping is determined based on at least the focal length of the video camera that captured the video, the content (i.e. pixels) of the captured video and a known size of one or more features in the captured image. The known size of the one or more features in the image may be used to determine a relative location of the video camera in the real-world. An example of this will now be described in relation to FIGS. 6A and 6B.

Figure 6A:
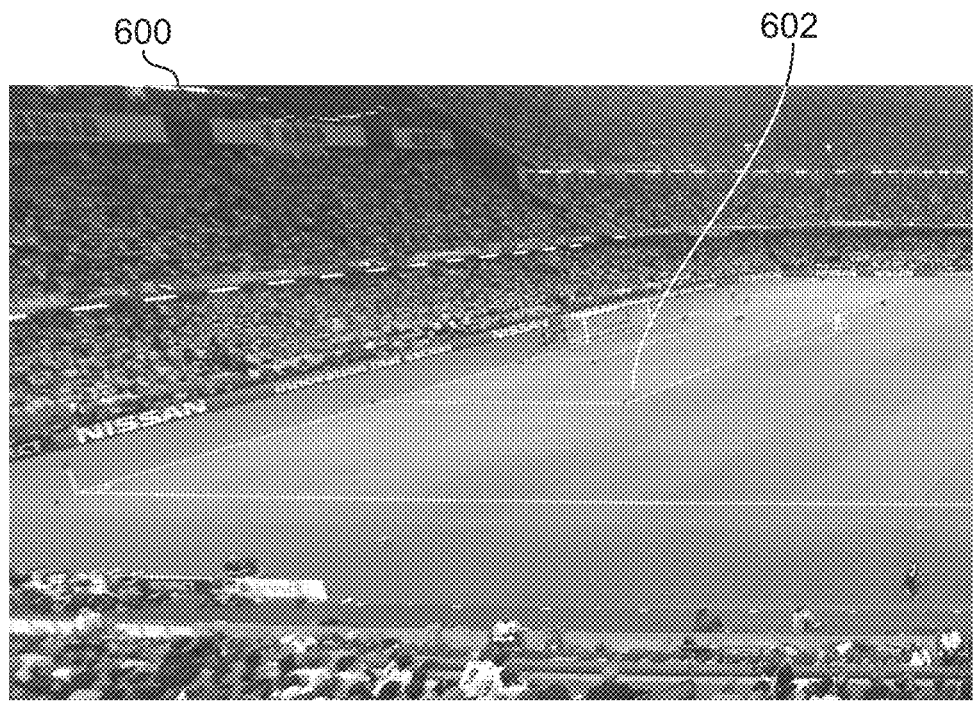
FIG. 6A shows an example of a video image of a football match.

FIG. 6A shows an example of a video image 600 of a football match captured by a video camera. As can be seen in FIG. 6A, the video camera is positioned within the stands of the football stadium and located towards one of the corners of the pitch. In FIG. 6A, the video image provides a view of a portion of the pitch including a goal and one of the corner flags. This position may be useful for capturing attacking play, for example.

Figure 6B:
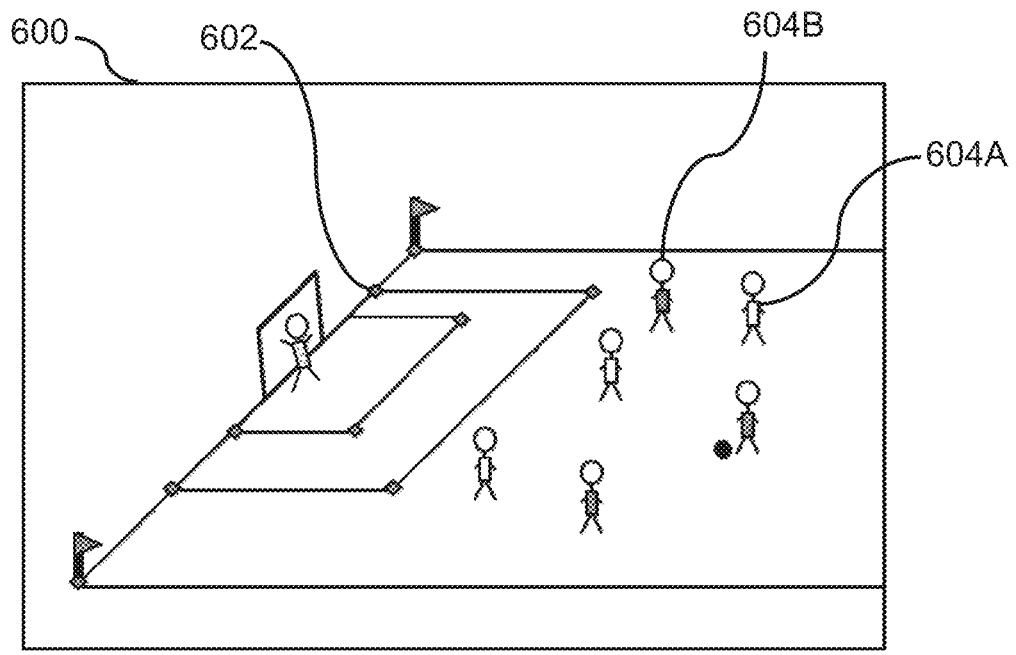
FIG. 6B shows a schematic version of the video image of a football match.

A schematic version of the captured video image is shown in FIG. 6B. However, in FIG. 6B a plurality of players are shown as being present in the shown portion of pitch. This may correspond to the same football match at a later time, for example.

In both Figures, it can be seen that the pitch consists of pre-defined regions. These regions correspond to the touch line, the 18 yard box, the 6 yard box and the penalty arc. If the size of these regions is known in advance then the position and/or orientation of the video camera relative to the pitch can be determined. This may involve, for example, marking out each of these regions with a plurality of markers, and inferring, based on the location and relative spacing of the markers, the position and/or orientation of the video camera relative to the pitch. Alternatively or in addition, the conventional markings on the pitch (e.g. white lines) may be compared to a template of a football pitch layout, with the scale and orientation of the template that best fits the markings in the image being indicative of the relationship of the pitch to the camera. Hence in either case, the lines marked on the pitch may be used to estimate the camera's matrix of extrinsic parameters. In FIGS. 6A and 6B, these regions are marked out with diamond-shaped markers 602.

It will be appreciated that, in some embodiments, the relative position and/or orientation of the video camera may be known in advance, and need not be determined based on an identification of pre-determined lines or patterns within the captured 2D video image. Alternatively, the approximate position and/or orientation of the video camera may be known in advance, thereby simplifying any marker identification and/or template matching.

Once the relative position and/or orientation of the video camera is known, the distance from the camera to a point on the pitch can be determined. The pitch can be modelled as a flat surface (of a predetermined size) and therefore the distance to any point on the pitch can be determined using simple geometry. Generally, this corresponds to knowing the size and shape of the pitch and how the distance of points on the pitch correlates with the orientation of the pitch shown in the captured video image. The distance of a point on the pitch relative to the video camera corresponds to $A_z$ in equation 2. Thus once this is known, the corresponding x- and y-coordinate ($A_x$ and $A_y$) of the point in the 3D scene can be determined, as described earlier.

In FIG. 6B, a plurality of players 604A, 604B are shown as being present on the portion of the pitch captured in 2D video image. In order to include these players in a three-dimensional reconstruction of the scene, it will be necessary to determine the location of the players, relative to the location of the video camera (in 3D).

Figure 7:
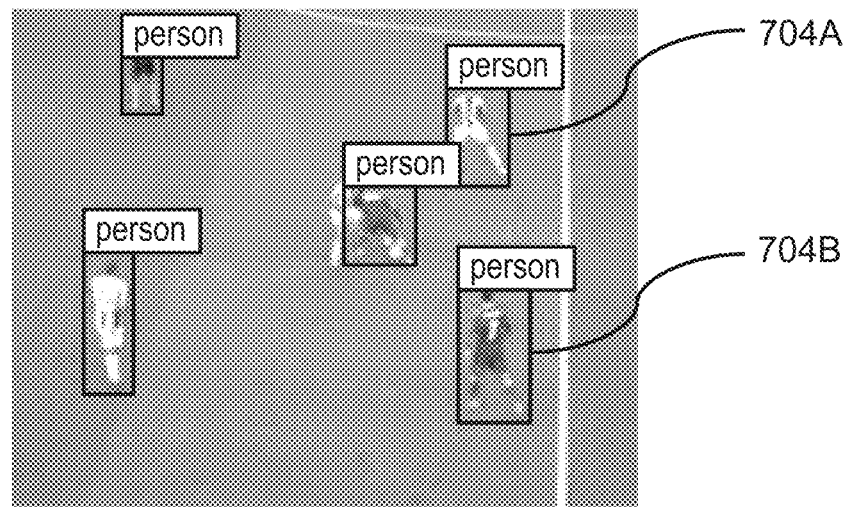
FIG. 7 shows an example of a video image in which a plurality of players have been detected.

The location of the player in the video may be identified using computer vision or machine learning, as is known in the art. An example of this player identification is shown in FIG. 7, where it can be seen that a plurality of players and their respective locations on the pitch have been identified in the video image. In FIG. 7, each identified player 704A, 704B is shown as enclosed in a rectangular box, with a header indicating that they have been identified as a 'person'. It will be appreciated that, in reality, this information may not necessarily be displayed to a user.

Figure 8:
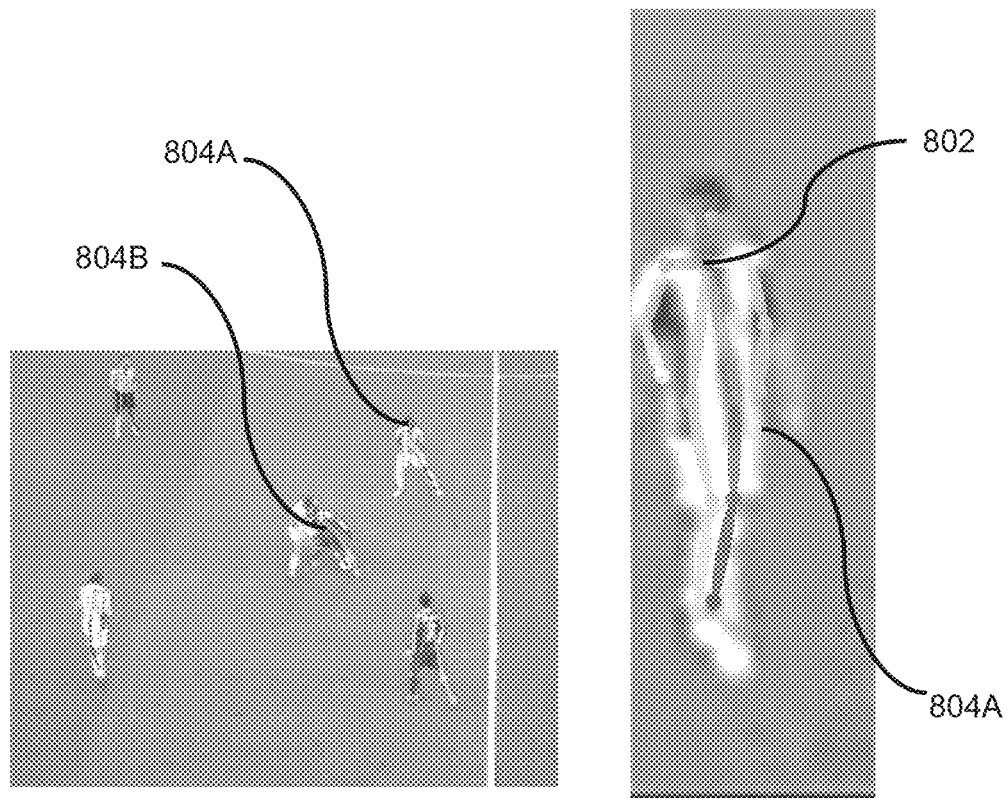
FIG. 8 shows an example of a video image in which the pose of a plurality of players has been identified.

In some embodiments, the location of the player on the pitch may be determined based on the location of the player's foot on the pitch. The location of the player's foot (or feet) may be determined by determining the location of one or more joints of the player, i.e. via pose estimation. Software such as OpenPose™ may be used to process the video images captured by the video camera and to detect human body, hand and facial keypoints. An example of the detection of one or more joints of the players in a video image is shown in FIG. 8. In FIG. 8, the leftmost image shows a plurality of players 804A, 804B for which a plurality of keypoints 802 have been identified. In the rightmost image of FIG. 8, it can be seen that 15 keypoints have been detected, two of which correspond to the player's head, another two of which correspond to the player's hands, and a bottom two corresponding to the player's feet.

By determining the location of the keypoints corresponding to the player's feet, the corresponding point on the pitch (i.e. directly beneath the feet) can be used to determine the location of the player in the 3D scene. The location of this point on the pitch may be determined as described earlier. If the player is in an upright position, the position of the rest of the player (i.e. the other keypoints) may be estimated based on the location of the other points relative to the player's feet. This estimation of the position of the player may be further improved if the height, or more generally, dimensions, of the player is known.

In some examples, the position of the player on the pitch may be estimated using the lowest keypoint, since this keypoint is likely to be closest to, or in contact with, the ground. Again, the position of the other detected keypoints can then be determined based on their relative position to the lowest keypoint. It will also be appreciated that where the same player is viewed by multiple cameras, positions can be derived from keypoints for multiple images, for example by excluding the most divergent position estimate from 3 or more images, and selecting one of the remainder or averaging them. This latter approach will depend on whether the techniques described herein are applied on the broadcaster's side (where multiple video feeds may be available) or one the viewer's side, where only a 2D (or 3D) broadcast signal is received. Both scenarios are within the scope of the present invention In other examples, a machine learning model may be used to determine whether a player is in contact with the ground, and if they are not, the corresponding point on the pitch that they are above. The machine learning model may be trained with video footage of football and games and the known 3D positions of players, for example. With the point that the player is above being known, the height of the player's feet (or foot) above the ground can then be determined, using e.g. the known geometry of the pitch. This could be further improved by using machine learning to recognize who the player is, such that the height of the player can be factored into the geometrical analysis. Again, where available multiple estimates from multiple images may be used to refine the estimate of the player's effective position with respect to the pitch.

The operations described above in relation to FIGS. 6 to 8 may be performed by the mapping processor 504 described previously. The mapping processor 504 may be located at a computing device that is separate from the video camera, and may be in communication with the video camera via a communications network linking the two together. The computing device may be, for example, a server; in some examples, the mapping processor 504 may be located at a personal computing device, such as a smartphone, laptop, tablet, PC, or the like.

Returning to the system shown in FIG. 5, the mapping processor 504 provides an input to the image generator 508. The image generator 508 is configured to generate a three-dimensional graphical representation of the 3D scene, based on the input received from the mapping processor 504. Here, the three-dimensional graphical representation is computer-generated and is not the same as the originally captured video footage.

The input provided by the mapping processor 504 includes the 2D video image, as well as the mapping determined by the mapping processor 504. The mapping defines a three-dimensional representation of geometric data, corresponding to points in the real-world scene captured by the video camera.

In some examples, the video camera may be static and have a fixed zoom (focal length). In such a case, the mapping between points on the pitch in the 2D image and points on the pitch in the 3D scene need only be determined once, since this should not change during the e.g. football game. In other examples, the video camera may be moved during the game; in such a case, the mapping will need to be updated accordingly (e.g. by updating the matrix of extrinsic parameters).

Naturally, the position of the players on the pitch will be expected to change during a game. Hence, the mapping processor 504 is configured to track the location of these players and to convert the position of the players in the 2D image into positions in the 3D, real-world scene. These 3D positions are then provided to the image generator 508, which uses them to generate a 3D graphical representation of the scene that includes the detected players at their corresponding locations on the pitch. The image generator 508 may be further configured to generate a graphical representation of the pitch that includes the players, as well as other physical objects such as the ball, the goal, corner flags, etc. The location of these other physical objects may be determined based on their corresponding locations on the pitch.

It will be appreciated that the players, their number, and the types of physical objects that they may interact with, will depend on the sport being played. Thus, whilst a game of football is described herein as an example, the types of objects that may be detected and included in the graphical representation of the scene will ultimately depend on the nature of the event being captured. Generally, any event may be represented in the manner described above, so long as the mapping between points in the captured 2D image and 3D scene can be determined. Hence different markers/and/or venue templates, and optionally different pose estimation models and/or machine learning models, may be selected as appropriate for other sports such as tennis, rugby, baseball, basketball, and the like; and indeed can extend for example to other live action activities such as horse racing or motorsports.

In some examples, the image generator 508 is configured to determine at least one attribute of a detected player. This attribute may include, for example, a team that the player is playing for, the pose of the player, and an identity of the player. The player can thus be represented graphically with this (these) attribute(s), once the attribute(s) have been determined.

The team that the player is playing for may be determined based on a colour that is identified in the region of the video image corresponding to the player. In one example, this may involve using a k-nearest neighbour algorithm to determine the dominant colours in the area containing each player in the 2D image, and separating the players into teams, based on the dominant colours common to certain groups of players.

In some examples, the image generator 508 is configured to identify a pre-determined team associated with the colours detected for each group of players. For example, if one group of players is detected as wearing predominantly red, this may be detected as corresponding to e.g. Liverpool FC. The image generator 508 may use machine learning for determining the association between the colours that a player is detected as wearing and the team that corresponds with those colours.

In some examples, the image generator 508 may have access to a plurality of pre-defined, graphical representations of sports kits, and may be configured to generate a graphical representation of a player wearing the pre-defined sports kit corresponding to the team identified for that player.

The pose of the player may be determined using pose estimation, which as described previously, may involve detecting a plurality of joints of each player. As described previously, this may involve using OpenPose™ to process each video image captured by the video camera. In some examples, the pose estimation may be combined with body mass estimation, such that the thickness of each segment joined by the joints detected using pose estimation, can be determined.

The image generator 508 may be configured to generate a graphical representation of the players detected in the video image, with a pose corresponding to the detected pose. If this is combined with the body mass estimation, then the e.g. arms, legs, torso, head, etc. of the player can be represented graphically with (approximately) the correct proportions. The image generator 508 may perform pose (and optionally, mass) estimation on a frame-by-frame basis, such that action occurring within the video can be animated graphically. This may allow in-game action to be viewed from an angle that is different from the camera angle provided by the video camera at its respective location.

The image generator 508 may be further configured to determine an identity of the players detected in the captured 2D video image. In one example, the image generator 508 may achieve this using facial recognition. For example, the image generator 508 may use OpenFace™ to process each received video image, and to detect facial features of any players in the video images. These detected facial features may then be compared against facial features defined for a plurality of known players, stored at e.g. a database that the image generator 508 has access to. If the detected facial features are sufficiently similar to those of a known player, then the player may be identified as having the known player's identity. It will be appreciated that facial recognition will be more useful for camera angles in which the player's face is clearly visible, and not where e.g. the camera provides an aerial view of the pitch. It will also be appreciated that when a player has been identified, then the player can be tracked over successive image frames, so that facial identification is not required for every frame. Re-acquisition of identity may only be required when tracking is lost, for example by full or partial occlusion by a team mate.

In other examples, other attributes of a player may be used to determine the identity of the player. This may involve, for example, using gait detection to determine the identity of the player. Certain players may have unique gaits that enable their identity to be determined. In broader examples, the detected movement of a player may be used to determine the identity of the player. For example, Cristiano Ronaldo is known to make long striding runs and to perform certain skills at a higher frequency than other players. Hence, a player may be identified as corresponding to Cristiano Ronaldo, if the player is detected as performing these movements, at e.g. an expected frequency.

Another attribute of the player may be an identifying number, logo or other combination of decorative elements that either uniquely identifies the player or reduces the number of possible players to search within on the basis of other attributes. For example, footballers usually have a unique combination of coloured shirt and number; jockeys usually have a unique combination of shirt and cap; and racing cars usually have a unique combination of colour and logos. Typically these are all known in advance of a broadcast event.

In some examples, a machine learning model may be used to determine the identity of players in the video image. This may involve, for example, training the model with footage of different football games, in which the location and identity of each player in the footage is known. Once trained, the model can then be used to identify the same players in unseen footage. As will be appreciated, the model would need to be trained with footage captured from the same camera angle as the footage currently being captured by the video camera.

Figure 9:
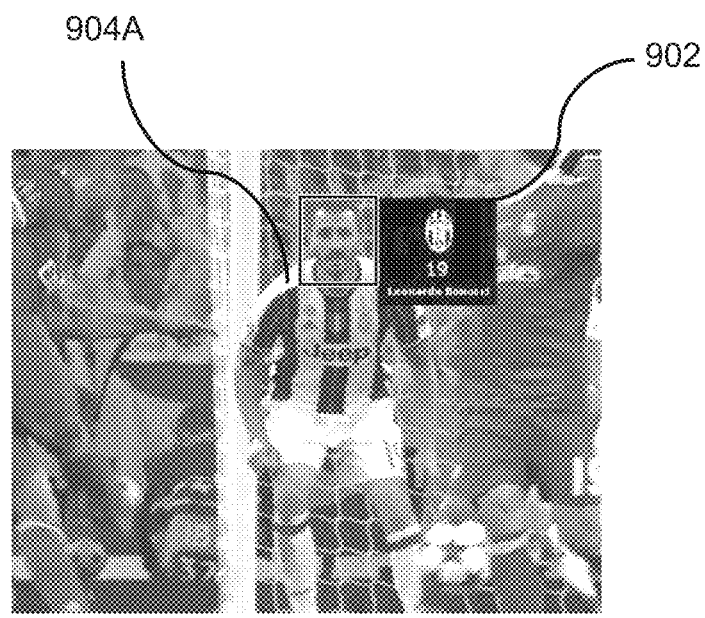
FIG. 9 shows an example of a video image in which the identity of a player has been determined.

An example of a video image in which a player has been identified is shown in FIG. 9. In this example, the player 904A has been identified as Leonardo Bonucci. The player 904A has also been identified as playing for the team Juventus, which is indicated via visual indicator 902. The team may have been identified in the manner described above. Alternatively, the team may be identified based on identification of the player. For example, the image generator 508 may have access to a database storing the identity of each player alongside their associated team. Thus, once the identity of a player has been determined (i.e. recognized), the team associated with that player can thus be determined.

In some examples, where available (e.g. if at the broadcasting side) the image generator 508 may generate a representation of the player based on images from multiple cameras, using a known photogrammetry technique.

In some examples, (e.g. either at the broadcasting side or at the viewer's/receiver's side) the image generator 508 may have access to a plurality of pre-defined graphical representations of players with known identities. Once the identity of a player has been identified, the image generator 508 may be configured to generate a graphical representation of the scene that includes the pre-defined graphical representation of the identified player, with the detected pose, and at a location on the pitch corresponding with the location of the player on the pitch in the 3D, real-world scene.

In some examples, (e.g. either at the viewer's/receiver's side) the user may be able to replace players detected in the video (with or without a detected identity) with pre-determined avatar. For example, a user may select to replace Leonardo Bonucci with Kratos from the video game God of War™, and e.g. watch a replay of goal being scored by Kratos instead of Leonardo Bonucci. In these examples, the image generator 508 may have access to a plurality of pre-determined avatars, each being defined in terms of their relative dimensions, keypoints and appearance. Once a player and their respective location and pose has been detected in the video, the image generator 508 can then generate an image of a pre-determined avatar at that location and with that pose. The avatar may be shown as being overlaid on top of the normal video, or as part of the graphical representation of the 3D scene. Hence in an embodiment of the present invention, a received 2D stream of a live event can be used to drive an augmented or virtual representation of the event in which one or more of the live event participants are replaced by virtual avatars, and alternatively or in addition, optionally the viewpoint of the event can also be modified by the viewer, as described herein below.

Returning to FIG. 5, the image generator 508 is configured to provide an input to a view processor 506. The input includes data indicating the graphical representation of the scene generated by the image generator 508. From this, the view processor 506 is configured to determine a virtual camera angle from which the graphical representation of the scene is to be displayed.

In preferred examples, this camera angle is different from the camera angle that was used to capture the original video footage. The virtual camera angle may be variable. For example, the view processor 506 may be configured to determine an initial position of the virtual camera, and how the virtual camera is to be moved from that position. In further examples, the view processor 506 may be configured to determine a plurality of virtual camera angles, with each virtual camera angle being used to capture a different portion of an in-game event. These different portions may then be stitched together, so as to provide different views of the in-game event (or rather, a graphical representation thereof), as it occurs.

In some embodiments, a user input may be used to control the virtual camera angle from which the graphical representation is to be displayed. For example, a user may be watching the live video stream at their user device, and may provide an input at a location on the screen, corresponding to a location at which they wish to position the virtual camera. To assist the user in this selection, the video may be paused. The view processor 506 may be configured to translate the selected location on the screen to a corresponding location in the graphical representation of the scene (or the selected location may first be translated by the mapping processor 504 into a real-world coordinate, which is then translated by the image generator 508 into a location in the graphical representation).

The user may then be presented with an initial view of the graphical representation from that viewpoint, and may further adjust the position and/or orientation of the virtual camera by providing a further input. The further input may include e.g. moving the user device, thereby causing the virtual camera to be moved in a corresponding manner (thereby allowing the user to act as a virtual camera man). In another example, the further input may include e.g. selecting a location in the graphical representation to move to that location, and performing e.g. a dragging or swiping gesture to rotate the camera, at that location. The user may select to pause the video (or rather, the computer-generated graphical representation thereof), whilst they are configuring the position and orientation of the video camera. Alternatively, they may adjust this, as the graphical representation of the on-going action is conveyed to them.

In additional or alternative embodiments, the virtual camera angle may be determined based on events that are detected as occurring within the video. In the example of a football game, the detected events may correspond to e.g. a goal, offside, foul, throw-in, corner, free-kick, etc.

The events may be detected, for example, using machine learning. For example, a machine learning model may be trained with video clips of known events and labels of those events, and trained to determine a correlation between the content of those video clips and the corresponding labels. Alternatively, the model may be trained via unsupervised learning, by using a plurality of video clips of e.g. football games, and classifying sufficiently similar video clips as corresponding to a particular type of event. Once trained, the output of the model may be used by the view processor 506 to determine a virtual camera angle from which that event is to be captured.

In other examples, the events may be detected based on e.g the audio associated with the video. For example, speech recognition may be used to identify words spoken by e.g. a commentator, from which the relevant event can be determined. Again, the speech recognition may be based on the use of machine learning, using a model that has been trained with speech samples and labels indicating the type of event associated with audio of that nature.

Once the relevant event has been detected, the view processor 506 may determine a corresponding virtual camera angle from which that event is to be viewed in the graphical representation of the scene. In some examples, this may involve selecting a predetermined position and/or orientation of the virtual camera that has been determined (e.g. by a developer) as being appropriate for that event. Moreover, this may also involve selecting a pre-determined motion of the virtual camera that has been identified as being appropriate for capturing that event. In some examples, the position and/or orientation of the virtual camera may be determined based on historic data, indicating where other users have commonly positioned and oriented the virtual camera for events of a similar nature.

In some embodiments, the virtual camera angle may be determined based on one or more players that are detected as contributing to a detected event. In the example of a football game, this may involve for example, detecting a first player and second player as contributing to an event (e.g. such as an assist and a subsequent goal), and determining a virtual camera angle that enables the actions of both players to be seen in the graphical representation. In some examples, this might involve determining a virtual camera angle that corresponds to the view of one of the players on the pitch. For example, in the event of a foul, the virtual camera angle may correspond to the view point of a referee that is detected as being on the pitch. This may allow a user to see (a graphical representation) of what the referee could see before the referee made his/her decision.

Having determined the virtual camera angle, the view processor 506 transmits an indication of the virtual camera angle, and the graphical representation of the scene, to an output unit (not shown). The output unit outputs (i.e. renders) an image corresponding to the view of the graphical representation, from the determined virtual camera angle. This view may then be displayed to the user, at their display device.

Figure 10:
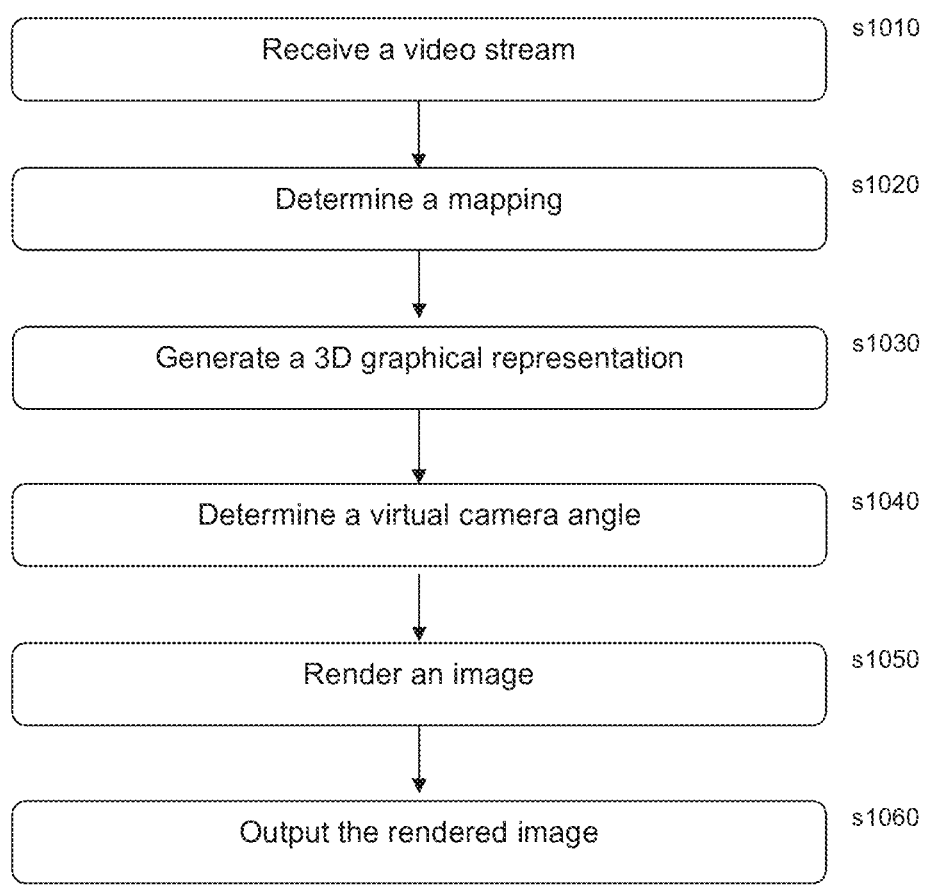
FIG. 10 is a flow diagram of a method of generating an image in accordance with embodiments of the present invention.

Hence in summary, referring to FIG. 10 A method of generating an image, the method comprising:

In a first step s1010, receiving a video stream, the video stream comprising a two-dimensional video of a three-dimensional scene captured by a video camera;

In a second step s1020, determining a mapping between locations in the two-dimensional video of the scene and locations in a three-dimensional representation of the scene, the mapping being determined based on a known parameter of the video camera and a known size of a feature in the three-dimensional scene;

In a third step s1030, generating a three-dimensional graphical representation of the scene based on the determined mapping;

In a fourth step s1040, determining a virtual camera angle from which the three-dimensional graphical representation of the scene is to be viewed;

In a fifth step s1050, rendering an image corresponding to the graphical representation of the scene viewed from the determined virtual camera angle, and In a sixth step s1060, outputting the rendered image for display.

Variant Embodiments

As described previously herein, embodiments of the present invention serve to capture the identity and position of players within a live stream/broadcast sporting event, typically at the recipient's device. Optionally, this identity and positional data may be stored for use after the live event, or exported for use during the live event, to a videogame that implements renditions of the relevant live event. Examples may include FIFA®, Football Manager®, Pro Evolution Soccer® or Madden® on the PlayStation 4. The videogame may then re-create the live event, optionally incorporating the outcome into any seasonal progress of one or more of the featured players or teams. Optionally, where the broadcast coverage does not show all of the pitch all of the time, the videogame can use its existing player control mechanisms to animate those players on pitch who were not shown in the live feed. This simulation may be additionally restricted to prevent any actions that would change the game outcome; hence for example no simulated goals may be scored. Similarly, based upon the advance information provided by the recorded data, the simulation moves players into the correct position for when they do appear in the live feed, so that their actions can swap from game-based animation to event-based animation. This may involve causing a player to run towards a position in which they subsequently first appear or re-appear within the representation sequence corresponding to the streamed video, or cause a car or horse to overtake or fall behind other simulated participants in order to be in the correct position as indicated in the representation sequence. In this way, a full game/event can be rendered within the videogame, with the elements of the event that were of key interest (and hence broadcast) being faithful to the original event, whilst other aspects of the event are improvised by game-based animation to provide context and atmosphere, and/or then interpolated from a simulated position to an event based position to match where they become part of the event-based animation.

Figure 11:
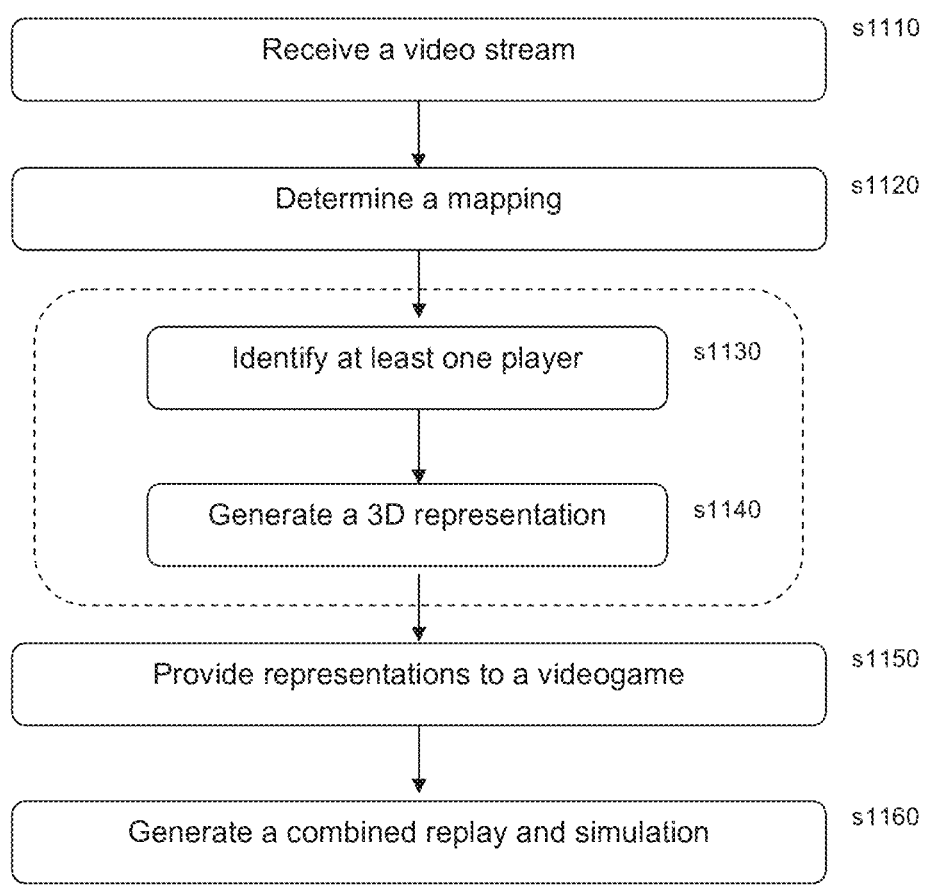
FIG. 11 is a flow diagram of a method of generating an image in accordance with embodiments of the present invention.

Hence in an embodiment of the present invention, and referring now also to FIG. 11, a method of generating an image comprising:

In a first step s1110, receiving a video stream, the video stream comprising a series of two-dimensional video images of a three-dimensional scene of a first event captured by a video camera;

In a second step s1120, determining a mapping between locations in the two-dimensional video of the scene and locations in a three-dimensional representation of the scene, the mapping being determined based on a known parameter of the video camera and a known size of a feature in the three-dimensional scene;

and for a respective video image, in a third step s1130, identifying at least one player/participant in the video image, and in a fourth step s1140, generating a three-dimensional representation of the scene based on the determined mapping, the three-dimensional representation comprising at least the position and identity of the at least one player;

In a fifth step s1150, providing a sequence of three-dimensional representations of the video images of the video stream to a videogame operable to simulate events of the type of the first event; and In a sixth step s1160, the videogame generating a combined replay and simulation of the first event, by replaying at least the position of the or each identified player in the sequence of three-dimensional representations of the video images, and simulating at least the position of the or each player not identified in a given video image.

With reference to FIGS. 5 and 10, it will be appreciated that the components shown may be executed at the same computing device, such as a server, or at a combination of computing devices, to implement the method. In some examples, the mapping processor 504 and image generator 508 may be executed at a server, whilst the view processor 506 is executed locally at a user's device (the user device being in communication with the server). In these examples, the user device may be configured to receive the graphical representation from the image generator 508. In other examples, the functionality of all of these components may be executed at a user's device, or remotely at e.g. a server. Ultimately, the distribution of this functionality will depend on the designer of the system, as well as the processing power available at the user's user device.

Similarly, with reference to FIG. 11, reception of the video stream by a receiving unit, mapping the scene by a mapping processor, player identification by a player detector and positioning by a scene representation generator may all be implemented on the same computing device and/or processor, for example under suitable software instruction, as may provision of the resulting data to a videogame, and the running of that videogame by a videogame processor to create a reconstruction of the streamed events, together with fill-in behaviour for unseen aspects of the event.

Hence it will be appreciated more generally that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims. Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

This application claims the benefit of patent application GB 1812141.8, filed Jul. 25, 2018, the entire disclosure of which is hereby incorporated by reference.

The invention claimed is:

1. A method of generating an image, the method comprising:
    receiving a video stream, the video stream comprising a two-dimensional video of a three-dimensional scene captured by a video camera;
    determining a mapping between locations in the two-dimensional video of the scene and locations in a three-dimensional representation of the scene, the mapping being determined based on a known parameter of the video camera and a known size of a feature in the three-dimensional scene;
    generating a three-dimensional graphical representation of the scene based on the determined mapping;
    determining a virtual camera angle from which the three-dimensional graphical representation of the scene is to be viewed;
    rendering an image corresponding to the graphical representation of the scene viewed from the determined virtual camera angle;
    outputting the rendered image for display; and
    detecting at least one object in the two-dimensional video of the scene,
    wherein generating the three-dimensional graphical representation comprises generating a graphical representation of the at least one detected object, and
    the video stream comprises a video of a sporting event and wherein detecting the at least one object comprises detecting at least one player in the scene; and wherein generating the three-dimensional graphical representation comprises generating a graphical representation of the at least one player.

2. A method according to claim 1, comprising:
    identifying a pre-determined pattern in the two-dimensional video;
    marking the predetermined pattern or region with a plurality of markers; and
    determining the mapping based on a relative spacing of the markers used to mark the pre-determined pattern.

3. A method according to claim 1, wherein detecting at least one player comprises determining an attribute of the at least one player; and wherein generating the graphical representation of the at least one player comprises generating a graphical representation of the player with the determined attribute.

4. A method according to claim 1, wherein detecting at least one player comprises determining a pose of the at least one player; and wherein generating the graphical representation of the at least one detected player comprises generating a graphical representation of the player with the detected pose.

5. A method according to claim 4, wherein detecting a pose of the at least one player comprises detect a plurality of joints of the player; and wherein the method comprises determining a location of the player in the three-dimensional scene, based on a location of one of the detected joints of the player in the two-dimensional video.

6. A method according to claim 4, wherein detecting at least one player comprises determining an identity of the at least one player, the determined identity corresponding to a pre-determined identity; and wherein generating the graphical representation of the at least one detected player comprises generating a graphical representation of the player with the determined identity.

7. A method according to claim 1, comprising replacing the at least one detected player with a graphical representation of a pre-determined avatar; and
wherein generating the graphical representation of the at least one detected player comprises generating a graphical representation of the pre-determined avatar instead of the player.

8. A method according to claim 1, comprising receiving a user input and wherein the virtual camera angle is determined based on the received user input.

9. A method according to claim 1, comprising:
detecting an event of interest occurring within the two-dimensional video of the scene;
detecting one or more objects involved in the detected event; and
wherein the virtual camera angle is determined based on at least one of the detected event and the one or more objects detected as being involved in the event.

10. A method of generating an image, comprising the steps of:
receiving a video stream, the video stream comprising a series of two-dimensional video images of a three-dimensional scene of a first event captured by a video camera;
determining a mapping between locations in the two-dimensional video of the scene and locations in a three-dimensional representation of the scene, the mapping being determined based on a known parameter of the video camera and a known size of a feature in the three-dimensional scene;
and for a respective video image,
identifying at least one player in the video image, and
generating a three-dimensional representation of the scene based on the determined mapping, the three-dimensional representation comprising at least the position and identity of the at least one player;
providing a sequence of three-dimensional representations of the video images of the video stream to a videogame operable to simulate events of the type of the first event;
the videogame generating a combined replay and simulation of the first event, by replaying at least the position of the or each identified player in the sequence of three-dimensional representations of the video images, and simulating at least the position of the or each player not identified in a given video image.

11. A non-transitory, computer readable recording medium having computer executable instructions stored thereon, which when executed by a computer system, cause the computer system to perform a method of generating an image by carrying out actions, comprising:
receiving a video stream, the video stream comprising a two-dimensional video of a three-dimensional scene captured by a video camera;
determining a mapping between locations in the two-dimensional video of the scene and locations in a three-dimensional representation of the scene, the mapping being determined based on a known parameter of the video camera and a known size of a feature in the three-dimensional scene;
generating a three-dimensional graphical representation of the scene based on the determined mapping;
determining a virtual camera angle from which the three-dimensional graphical representation of the scene is to be viewed;
rendering an image corresponding to the graphical representation of the scene viewed from the determined virtual camera angle;
outputting the rendered image for display; and
detecting at least one object in the two-dimensional video of the scene,
wherein generating the three-dimensional graphical representation comprises generating a graphical representation of the at least one detected object, and
the video stream comprises a video of a sporting event and wherein detecting the at least one object comprises detecting at least one player in the scene; and wherein generating the three-dimensional graphical representation comprises generating a graphical representation of the at least one player.

12. A non-transitory, computer readable recording medium having computer executable instructions stored thereon, which when executed by a computer system, cause the computer system to perform a method of generating an image by carrying out actions, comprising:
receiving a video stream, the video stream comprising a series of two-dimensional video images of a three-dimensional scene of a first event captured by a video camera;
determining a mapping between locations in the two-dimensional video of the scene and locations in a three-dimensional representation of the scene, the mapping being determined based on a known parameter of the video camera and a known size of a feature in the three-dimensional scene;
and for a respective video image,
identifying at least one player in the video image, and
generating a three-dimensional representation of the scene based on the determined mapping, the three-dimensional representation comprising at least the position and identity of the at least one player;
providing a sequence of three-dimensional representations of the video images of the video stream to a videogame operable to simulate events of the type of the first event;
the videogame generating a combined replay and simulation of the first event, by replaying at least the position of the or each identified player in the sequence of three-dimensional representations of the video images, and simulating at least the position of the or each player not identified in a given video image.

13. A system comprising:
a receiving unit configured to receive a video stream, the video stream comprising a two-dimensional video image of a three-dimensional scene;
a detecting unit configured to detect at least one object in the two-dimensional video of the scene, wherein the video stream comprises a video of a sporting event and wherein detecting the at least one object comprises detecting at least one player in the three-dimensional scene;

a mapping processor operable to determine a mapping between coordinates in the plane of the video image and coordinates in a three-dimensional space representing the three-dimensional scene; wherein the mapping is determined based on a parameter of the video camera that captured the video image and a pre-determined size of a feature that is known to be present in the three-dimensional scene;

an image generator configured to generate a three-dimensional graphical representation of the scene based on the determined mapping, wherein generating the three-dimensional graphical representation comprises generating a graphical representation of the at least one detected object and a graphical representation of the at least one player;

a view processor operable to determine a virtual camera angle from which the three-dimensional graphical representation of the scene is to be viewed; and an output unit configured to output an image corresponding to the three-dimensional graphical representation of the scene viewed from the determined virtual camera angle.

14. A system according to claim 13, wherein the video stream comprises a video of a sporting event, and wherein the system further comprises:

a player detector operable to detect a player in two-dimensional video of the scene; and wherein the image generator is configured to generate a three-dimensional graphical representation of the scene that includes a three-dimensional graphical representation of the player.

15. A system according to claim 14, wherein the player detector is configured to detect at least one attribute of the player, the attribute comprising at least one of:
  i. a team associated with the at least one player;
  ii. a pose of the at least one player;
  iii. an identity of the at least one player; and wherein the image generator is configured to generate a three-dimensional representation of the player with at least one of the detected attributes.

16. A system according to claim 13, comprising an input device configured to receive a user input; and wherein the view processor is operable to determine the virtual camera angle based on the received user input.

17. A system comprising for generating an image, comprising:

a receiving unit configured to receive a video stream, the video stream comprising a series of two-dimensional video images of a three-dimensional scene of a first event captured by a video camera;

a mapping processor operable to determine a mapping between locations in the two-dimensional video of the scene and locations in a three-dimensional representation of the scene, the mapping being determined based on a known parameter of the video camera and a known size of a feature in the three-dimensional scene;

and for a respective video image, a player detector is operable to identify at least one player in the video image, and a scene representation generator is operable to generate a three-dimensional representation of the scene based on the determined mapping, the three-dimensional representation comprising at least the position and identity of the at least one player;

the system is adapted to provide a sequence of three-dimensional representations of the video images of the video stream to a videogame operable to simulate events of the type of the first event; and a videogame processor is adapted to run the videogame, which is adapted to generate a combined replay and simulation of the first event by replaying at least the position of the or each identified player in the sequence of three-dimensional representations of the video images, and simulating at least the position of the or each player not identified in a given video image.

* * * * *